June 21, 1932.   A. H. COOKE   1,863,898
BRINING APPARATUS
Filed Oct. 31, 1929   2 Sheets-Sheet 2
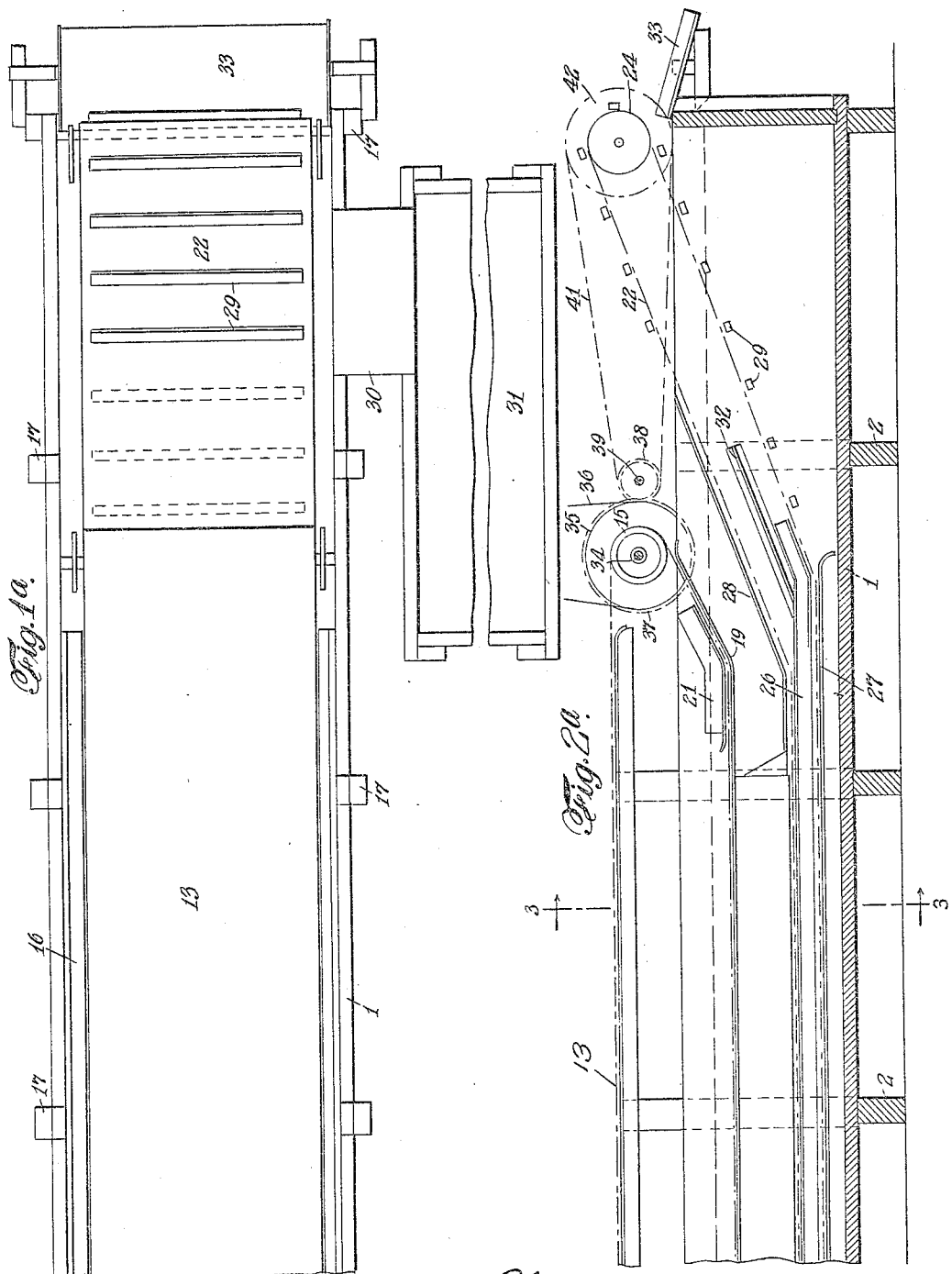

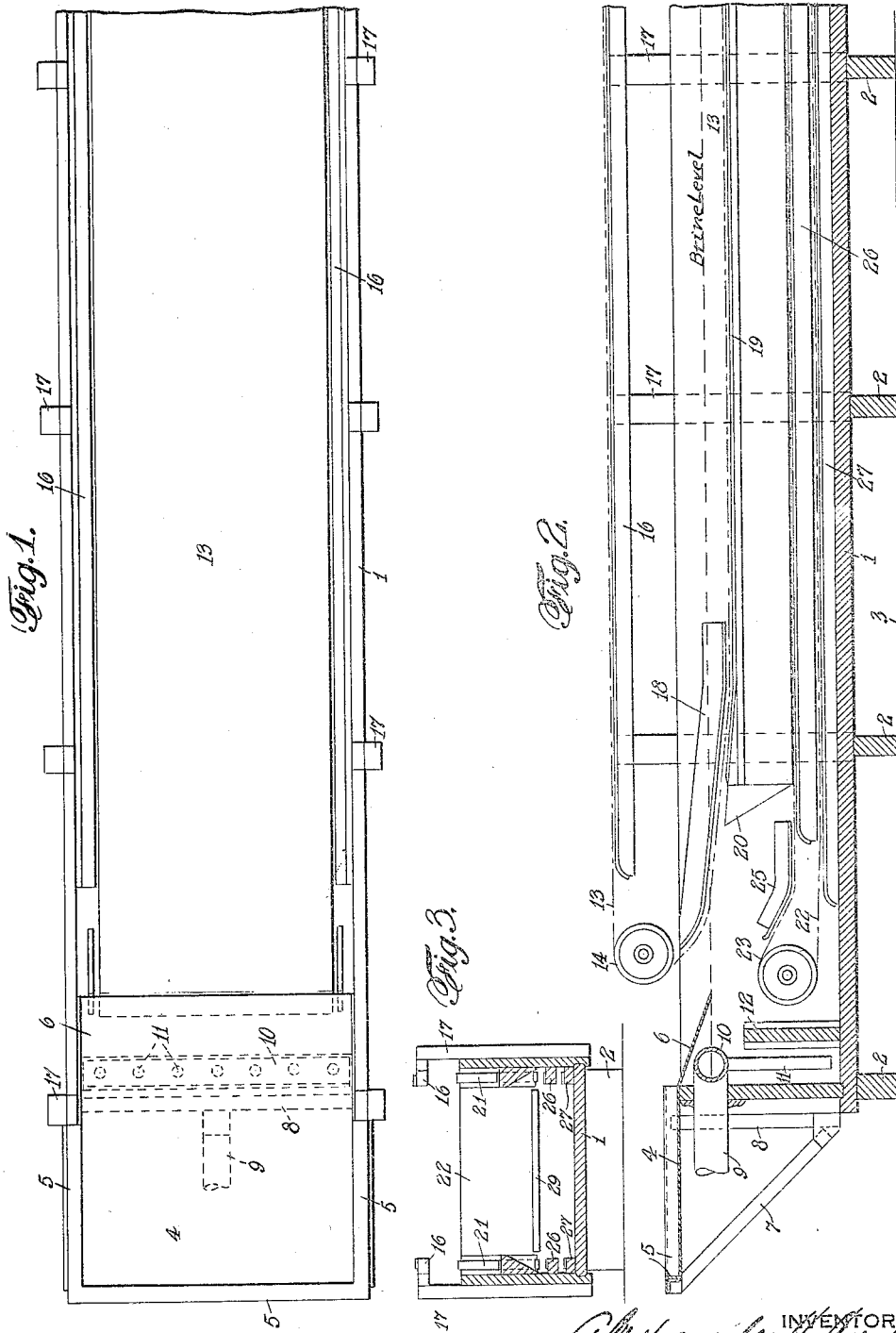

Patented June 21, 1932

1,863,898

UNITED STATES PATENT OFFICE

ALEXANDER H. COOKE, OF NEW YORK, N. Y., ASSIGNOR TO THE ATLANTIC COAST FISHERIES COMPANY, OF NEW YORK, N. Y., A CORPORATION OF MAINE

BRINING APPARATUS

Application filed October 31, 1929. Serial No. 403,683.

This invention relates to a brining machine and more particularly to an apparatus for brining fish fillets.

It has for an object a brining apparatus which is inexpensive and efficient.

Another object of this invention is to provide a brining apparatus wherein the fish to be treated are freely suspended in the brine and maintained beneath the surface thereof.

An additional object of this invention is to provide a brining apparatus wherein the fish to be treated are freely suspended and conveyed through a passage formed in the brine by means of pervious materials, provision being made to maintain the fish in their passage through the brine beneath the surface thereof.

A further object of this invention is to provide a brining apparatus in which the fish are conveyed therethrough by means of the flow or circulation of the brine within the tank.

A still further object of this invention is to provide a brining appartus wherein fish to be treated are conveyed through the brine by means of the flow or circulation of the brine within the tank in combination with means for maintaining the fish submerged and beneath the surface of the brine, provision also being taken to increase the rate of flow or circulation at desired points.

Other objects will appear in the following description, appended claims and accompanying drawings forming a part of this specification and in which:

Figures 1 and 1a taken together illustrate a top plan view of the apparatus.

Figures 2 and 2a taken together illustrate a vertical section of the apparatus, and Figure 3 illustrates a section taken on lines 3—3 of Figure 2a.

Referring to the drawings wherein like reference characters designate like parts, the reference numeral 1 designates a tank mounted on supports 2—2 disposed on the floor 3 of the plant and containing a brine, the level of which is as indicated in Figures 2 and 2a. At one end, the tank 1 is provided with a loading table 4 on which the fish to be treated are disposed prior to their introduction into the brine. The table 4 is provided with flanges 5 on the rear and side edges thereof whereby the fish disposed thereon may not accidentally be displaced therefrom. The front edge of the table cooperates with a shelf 6, preferably angularly disposed as illustrated in the drawings, aiding in the introduction of the fish into the brine. The table is securely supported by means of supports 7 and 8 suitably secured thereto and to the tank.

Adjacent the loading table, means are provided whereby the brine may be introduced into the tank. This means includes a pipe 9, connected to any suitable source of supply (not shown) and communicating with a manifold 10 having inlets 11 disposed between one end of the tank and a weir 12, for reasons which will hereafter become apparent.

Fillets of fish have a tendency to float in the brines usually employed. Hence, to insure treating the entire surface of the fillet, it is desirable to submerge the same in the brine. With this in view, an endless belt 13, formed of any pervious material such as wire, trained over sprockets 14 and 15, is provided. This belt 13, in the course of its travel, is submerged in the brine beneath the surface thereof and thus limits the upward buoyant movement of the fish in the brine. Inasmuch as the belt 13 is made of a pervious material, the brine is permitted to penetrate therethrough and contact with all surfaces of the fish being treated.

The belt 13, in its travel outside of the brine, is directed by means of guides or shoes 16, carried on supports 17, suitably disposed on both sides of the tank and engaging or contacting with the marginal edge portion of the belt. When the belt 13 passes from the sprocket wheel 14 into the tank, it assumes an angular direction. To maintain this angular direction, guides or shoes 18, suitably mounted on both sides of the tank 1 engage the marginal edge of the belt and properly direct the belt 13. In the course of the belt's travel through the brine within the tank 1, it is guided by shoes or guides 19, disposed on both sides thereof and mounted on blocks 20 and the supports suitably secured to the sides of the tank. Preferably, guides 18 are made of such length that they cooperate for some distance with guides 19. In passing from the tank to the sprocket wheel 15, the belt 13 also assumes an angular direction. To aid the belt at this point to take its proper course, guides 19 at the ends thereof are bent upwardly and cooperate with guides 21 disposed adjacent the point of exit of the belt from the brine. Guide 21 is preferably made in a form corresponding to the direction which the belt takes as it passes from the brine to the sprocket wheel 15.

The belt 13 with its cooperating parts maintains the fish to be treated beneath the level of the brine within the tank. After the fish have traversed through the brine, it is, of course, necessary to remove the fish from the tank. To attain this, there is provided in the lower portion of the tank a belt 22 also formed of a pervious material and trained over sprockets 23 and 24. In the course of its travel, belt 22 is guided and maintained in its desired position by means of guides or shoes 25, 26 and 27 engaging the marginal edge portions and suitably secured to the sides of the tank.

Adjacent the point where belt 22 begins its upward course to pass from the brine, there is provided a guide 28 disposed in a direction or having a form corresponding to that taken by the belt at this point of its travel. To facilitate the removal of the fish from the tank and particularly the fish which have been weighted and sunk, belt 22 is provided with cleats 29 whereby the fish carried up by the belt are retained thereon.

In operation, the fish, placed on the loading table, are pushed across the shelf 6 into the brine and carried into the passage formed by the conveyors 13 and 22 by the brine flowing over weir 12. The belt 13 maintains the fish beneath the level of the brine in the tank and the belt 22 aids in removing the fish from the tank, the cleats 29 preventing the fish disposed on the belt from sliding or slipping off as above mentioned. It is to be noted that the fish are freely suspended in the brine and are not restricted in their longitudinal movement through the brine in any way. The upper belt 13, of course, serves to maintain the fish beneath the surface of the brine.

The fish are, however, conveyed through the brine by means of the flow of the brine within the tank. As previously explained, the brine is introduced at one end of the tank through the manifold 10 and inlets 11, said brine passing over the weir 12 and thence through the tank. A continuous flow or circulation of the brine is attained by providing an overflow 30, communicating with the tank, whereby the surface of the brine within the tank is maintained at a substantially uniform level. From the overflow 30, the brine passes into an overflow tank 31 which, if desired, may be connected to the pipe 9, whereby a continuous circulation of the brine is obtained. In such an arrangement of parts, it may be advisable to employ a pump between the overflow and inlet. Preferably the rate of flow of the brine is maintained substantially equal to the rate of travel of the belts as hereafter explained.

It has been found that the circulation of the brine through the tank, though satisfactory, may be improved; that is, the conveying of the fish by means of the circulating brine may be facilitated, particularly adjacent the point where the fish make their exit from the brine. This is attained by changing the velocity of the flowing brine by introducing and disposing a baffle 32, adjacent the point where the fish are being withdrawn from the brine. The baffle 32 serves to form a restricted passage through which the brine passes. Inasmuch as the same quantity or volume of water must pass through this restricted area, as through the nonrestricted area, the rate of flow through the said restricted area is much faster and thus the conveyance of the fish through this portion is greatly increased.

The fish, as before explained, are carried up on the belt 22 and maintained thereon by means of the cleats 29. As the belt 22 passes around sprocket wheel 24, the fish are dropped on to a shelf or tray 33, from which the fish are directed into any suitable container, belt or the like.

Movement of belts 13 and 22 may be obtained in any suitable manner. In the drawings, belt 13 is driven by sprocket wheel 15 mounted on shaft 34 by means of a pulley 35 and a belt 36 driven by any suitable source of supply. Mounted on shaft 34 is a pulley or gear 37, cooperating with a pulley or gear 38, disposed on a shaft 39, whereby rotation to shaft 39 is imparted. Rotation of shaft 39 is transmitted to shaft 40 on which sprocket wheel 24 is mounted through belt 41 and pulley 42.

The parts of the apparatus, such as the wire belts, sprockets and guide, are formed of a metal which is nonresistant to corrosion by the brine. Various metals may be used for this purpose. I have found, however, that Monel metal produces satisfactory results.

From the foregoing, it is apparent that I have provided a brining apparatus which is inexpensive to manufacture, simple to operate and very efficient in use. The fish, in their passage through the brine, are at all times submerged and maintained beneath the surface thereof, thus insuring that all portions of the fish are properly treated. The travel of the fish through the brine solution is such that upon the exit thereof the fish will be properly treated. The fish are conveyed through the apparatus by means of the circulation of the brine which is accelerated at certain points.

Since it is obvious that various changes in the specific details above set forth may be made by any one skilled in the art, the invention is not restricted thereto except as set forth in the appended claims.

I claim:

1. A brining apparatus comprising a tank containing a brine wherein the fish to be treated are freely suspended and not restricted in their longitudinal movement therethrough, means to maintain said fish beneath the surface of said brine and means to supply and withdraw the brine whereby the flow thereof in the tank conveys the fish therethrough.

2. A brining apparatus comprising a tank containing a brine wherein the fish to be treated are freely suspended and not restricted in their longitudinal movement therethrough, a plurality of pervious belts forming a passage therebetween through said brine beneath the surface thereof, and means to supply and withdraw the brine whereby the flow thereof conveys the fish through said passage.

3. A brining apparatus comprising a tank containing a brine wherein the fish to be treated are suspended and not restricted in their longitudinal movement therethrough, a pervious belt disposed in the lower portion of said tank, and another pervious belt disposed adjacent the upper portion of said tank, said belts forming a passage through said brine beneath the surface thereof and means to supply and withdraw the brine whereby the flow thereof conveys the fish through said passage.

4. A brining apparatus comprising a tank containing a brine wherein the fish to be treated are freely suspended, means to maintain said fish beneath the surface of said brine, means to supply and withdraw the brine whereby the flow thereof in the tank conveys the fish therethrough, and means to increase the rate of flow of the brine in said tank adjacent the point where the fish leave the brine.

5. A brining apparatus comprising a tank containing a brine wherein the fish to be treated are freely suspended, means to maintain said fish beneath the surface of said brine, means to supply and withdraw the brine whereby the flow thereof in the tank conveys the fish therethrough, and a baffle within said tank adjacent the point where the fish leave the brine increasing the rate of flow of the brine therein.

6. A brining apparatus comprising a tank containing a brine wherein the fish to be treated are freely suspended, means to maintain said fish beneath the surface of said brine, means to supply and withdraw the brine whereby the flow thereof in the tank conveys the fish therethrough, and means forming a restricted passage to increase the rate of flow of the brine in said tank adjacent the brine where the fish leave the brine.

In testimony whereof, I have affixed my signature to this specification.

ALEXANDER H. COOKE.